(12) United States Patent
Campbell et al.

(10) Patent No.: US 8,097,068 B2
(45) Date of Patent: Jan. 17, 2012

(54) METHOD FOR TREATING A DIAMINE ABSORBENT STREAM

(75) Inventors: Matthew Campbell, Montreal (CA); John Sarlis, Laval (CA); Vijay Bhambhani Godhwani, Montreal (CA); Melina Infantino, Montreal (CA)

(73) Assignee: Cansolv Technologies Inc., Montreal, Quebec (CA)

( * ) Notice: Subject to any disclaimer, the term of this patent is extended or adjusted under 35 U.S.C. 154(b) by 589 days.

(21) Appl. No.: 12/266,012

(22) Filed: Nov. 6, 2008

(65) Prior Publication Data
US 2010/0108610 A1    May 6, 2010

(51) Int. Cl.
*B01D 53/14* (2006.01)

(52) U.S. Cl. ............... 95/196; 95/205; 95/236; 210/673; 210/681; 423/228

(58) Field of Classification Search .................. 210/660, 210/670, 662, 683, 677, 681, 685; 423/228, 423/229, 236, 243
See application file for complete search history.

(56) References Cited

U.S. PATENT DOCUMENTS

| | | | |
|---|---|---|---|
| 4,113,849 A | 9/1978 | Atwood | |
| 4,122,149 A | 10/1978 | Dunnery et al. | |
| 4,336,102 A | 6/1982 | Jacobs et al. | |
| 4,795,565 A * | 1/1989 | Yan | 210/669 |
| 4,970,344 A | 11/1990 | Keller | |
| 5,006,258 A * | 4/1991 | Veatch et al. | 423/229 |
| 5,019,361 A * | 5/1991 | Hakka | 423/242.7 |
| 5,045,291 A | 9/1991 | Keller | |
| 5,082,567 A | 1/1992 | Fritts et al. | |
| 5,162,084 A * | 11/1992 | Cummings et al. | 210/662 |
| 5,292,407 A * | 3/1994 | Roy et al. | 205/431 |
| 5,368,818 A | 11/1994 | Cummings et al. | |
| 5,788,864 A | 8/1998 | Coberly et al. | |
| 6,245,128 B1 | 6/2001 | George, Jr. | |
| 6,280,609 B1 * | 8/2001 | Vora et al. | 208/152 |
| 6,334,886 B1 | 1/2002 | Barnes, Jr. et al. | |
| 7,214,358 B2 | 5/2007 | Ravary et al. | |
| 2007/0213415 A1 | 9/2007 | Sarlis | |

FOREIGN PATENT DOCUMENTS

| | | |
|---|---|---|
| EP | 0429183 A1 | 5/1991 |
| EP | 0430432 A2 | 6/1991 |
| EP | 0471592 A2 | 2/1992 |

OTHER PUBLICATIONS

International Search Report received on the corresponding international application No. PCT/CA2009/001580, mailed Jan. 22, 2010.
International Search Report and Written Opinion received on the corresponding international application No. PCT/CA2009/001580, mailed on Jan. 22 , 2010.

* cited by examiner

*Primary Examiner* — Duane Smith
*Assistant Examiner* — Ives Wu
(74) *Attorney, Agent, or Firm* — Bereskin & Parr LLP/S.E.N.C.R.L., s.r.l.; Philip C. Mendes da Costa (57) ABSTRACT

A diamine absorbent that contains heat stable salts is regenerated using an ion exchange process wherein the concentration of heat stable salts in the feed stream provided to the cation exchange unit is limited.

32 Claims, 5 Drawing Sheets

METHOD FOR TREATING A DIAMINE ABSORBENT STREAM

FIELD

In one aspect, the disclosure relates to a method for treating a diamine absorbent stream comprising at least one heat stable salt. In a particularly preferred aspect, the disclosure relates to a method for operating an ion exchange process during the regeneration of an acid gas diamine absorbent.

BACKGROUND

The separation of acid gases such as sulfur dioxide ($SO_2$) or carbon dioxide ($CO_2$) from gas streams such as waste gas streams, e.g. flue gas streams, or hydrocarbon containing streams by means of absorption into aqueous amine solvents is well known. Many of these processes, which are referred to as amine treater processes, are described in "Gas Purification", $5^{th}$ Edition, Ed. Arthur L. Kohl and Richard B. Nielsen, Gulf Publishing Company, Houston, Tex.

Amine treater processes use a regenerable amine solvent whereby the acid gas is captured into the solvent at one temperature and the acid gas is desorbed or stripped from the solvent, generally at a higher temperature.

The amine solvent for removing a given acid gas component from a feed stream may be chosen so that the acid gas can be removed from the solvent by steam stripping. If steam stripping is utilized, then in order to separate the acid gas from the solvent, the acid gas must be volatile while in solution. Preferably, the acid ionization constant of the conjugate acid of the amine (the $pK_a$) has a value no more than about 3 or 4 units higher than the $pK_a$ of the acid gas. If this difference in $pK_a$ is larger than about 3 or 4 units, then the salt formed between the amine and the acid is too stable to be practically dissociated by steam stripping.

In commercial operation, acid gas capture processes experience ingress and/or in process generation of acids that are stronger than the acids for which the removal process is designed. These stronger acids form salts with the amine solvent which are not regenerable with steam and are thus termed heat stable amine salts, or just heat stable salts.

If the heat stable salts are allowed to accumulate, they will eventually neutralize all the amine of the solvent, rendering it unable to react with and remove the acid gas component as intended. Accordingly, provision for heat stable salt removal is desirable for systems where strong acids may accumulate in the amine solvent.

Various means for the removal of heat stable salts from amine gas treating solutions are known. These include distillation of the free amine away from the salt at either atmospheric or subatmospheric pressure (see for example "Gas Purification", p. 255ff), electrodialysis (see for example U.S. Pat. No. 5,292,407) and ion exchange (see for example U.S. Pat. No. 4,122,149; U.S. Pat. No. 4,113,849; U.S. Pat. No. 4,970,344; U.S. Pat. No. 5,045,291; U.S. Pat. No. 5,292,407; U.S. Pat. No. 5,368,818; U.S. Pat. No. 5,788,864 and U.S. Pat. No. 6,245,128).

One problem with ion exchange processes is that the ion exchange medium or resin must be regenerated from time to time. During the loading stage of the ion exchange process, the anion removal capacity of the anion exchange resin and the cation removal capacity of the cation exchange resin are reduced as heat stable salts are removed from the amine solvent. Upon exhaustion or reduction of the anion removal capacity of the ion exchange resin by a particular amount, feed of the heat stable salt rich amine solvent to the ion exchange resin is terminated so that the ion exchange resin may be regenerated. During regeneration of the ion exchange resin, the amine solvent may be displaced from the amine resin bed by using large volumes of water to wash the resin bed. This results in the production of a dilute amine solvent solution. Subsequently, the flow of wash water is terminated and a resin regeneration agent is provided to the resign bed. The resin regeneration agent may then be washed from the resin bed to complete the regeneration of the resin bed.

SUMMARY

In accordance with one aspect of the present disclosure, an improved method for operating an ion exchange process to remove heat stable salts from an acid gas absorbent is provided. The acid gas absorbent is preferably obtained from an acid gas recovery unit. In accordance with this method, an ion exchange process may be operated so as to reduce the loss of acid gas absorbent and/or to reduce the dilution of the acid gas absorbent that is recovered during the ion exchange regeneration process and returned to the acid gas recovery unit. In particular, it has surprisingly been determined that contacting a diamine absorbent stream with an acidic cation exchange resin, wherein the diamine absorbent stream fed to the resin comprises a low concentration of heat stable salts, maximizes cation removal and results in lower diamine loss.

In operation, the diamine absorbent stream may be obtained from an acid gas recovery unit. The acid gas recovery unit preferably includes an absorption unit and a regeneration unit, which are preferably operated cyclically. Accordingly, the absorbent is loaded with acid gas in the absorption unit and at least some of the acid gas is removed from the absorbent in the regeneration unit. Accordingly, the absorbent is continually cycled through the process. From time to time, fresh absorbent may be added to replace absorbent that is lost during operation of the process.

In the absorption unit, a feed gas (e.g., a waste gas) containing at least one acid gas, such as sulfur dioxide ($SO_2$), carbon dioxide ($CO_2$), nitrous oxides ($NO_x$) and combinations of one or more of these gasses, is contacted with an absorbent, such as by passing the feed gas through an absorption column. As the feed gas passes through the column, at least some of one or more acid gases are absorbed by a diamine absorbent producing a diamine absorbent stream, which may also be referred to as a spent absorbent stream.

In the regeneration unit, the spent absorbent stream is treated to remove at least some of the acid gas that has been absorbed by the absorbent. The absorbent is preferably regenerated using steam, such as by passing the spent absorbent stream through a steam stripper, wherein through the use of steam, the acid gas dissociates from the amine solvent. Inevitably, acids that cannot be dissociated from the amine solvent using heat remain in the absorbent in the form of the heat stable amine salts.

At least some of the diamine absorbent stream comprising at least one heat stable salt, e.g., a bleed stream, is withdrawn from the acid gas recovery unit, preferably subsequent to the regeneration of the absorbent but prior to the reuse of the absorbent in the absorption step, and is then directed to the ion exchange unit. The ion exchange unit preferably comprises an anion exchange unit (preferably comprising one or more anion exchange beds) wherein anions of the heat stable salts such as one or more of sulfates, thiosulfates, sulfites, chlorides, nitrates and organic acids are removed followed by a cation exchange unit (preferably comprising one or more cation exchange beds) wherein cations from the heat stable salts, such as one or more of sodium, potassium and lithium are removed. The anion and cation exchange units are each preferably operated according to the following sequence.
1. Contact the absorbent with the ion exchange medium to remove anions or cations of the heat stable salts from the absorbent.
2. Provide clean wash water to the ion exchange medium to remove absorbent from the medium and optionally recycle at least a portion of the used wash water to the acid gas recovery unit (the pre-resin regeneration wash step).
3. Contact the ion exchange medium with a regeneration agent to regenerate the ion exchange medium.
4. Provide wash water to the ion exchange medium to remove regeneration agent from the medium.

It has been determined that when the diamine absorbent stream fed to the cation exchange unit has a concentration of heat stable salts less than about 1 equivalent/mole of diamine unit, the cation exchange process may be operated to reduce the heat stable salt content of the absorbent while surprisingly reducing the dilution of the absorbent and/or the loss of absorbent. It will be understood that, as used herein, the heat stable salt concentration refers to the concentration of anions that form the heat stable salts. The terms "equivalent/mole of diamine unit", "eq/mol diamine" or "heat stable salt amine/mol of diamine unit", are all defined as the concentration (mol·L$^{-1}$) of anions (for example sulfate, $SO_4^{2-}$) multiplied by their absolute respective charge (in the case of $SO_4^{2-}$, the absolute charge is 2), divided by the concentration of the diamine absorbent (mol·L$^{-1}$). The need to multiply the concentration of the anions by their respective charge arises because multiply charged anions (such as $SO_4^{2-}$) are able to sequester two molecules of the diamine absorbent.

During the pre-resin regeneration wash step, amine absorbent is flushed from the resin bed. If the concentration of amine is sufficiently high (e.g., 500 ppm), then the spent wash water stream may be recycled to the acid gas capture unit to prevent the loss of the absorbent. If the concentration of amine is lower, then the addition of the wash water to the absorbent circulating in the acid gas capture unit would overly dilute the absorbent. Accordingly, at least a portion of the amine absorbent that is flushed from the resin bed during the pre-resin regeneration wash step will be lost. Intuitively, it would typically be considered preferable to treat an absorbent stream having a higher concentration of heat stable salts since, during the pre-resin regeneration wash step, some absorbent will be lost to avoid excessive dilution of recycled absorbent. The use of a more concentrated stream would permit a higher removal rate of heat stable salts in the ion exchange bed, thereby requiring less absorbent to be treated and, accordingly reducing absorbent loss in the pre-resin regeneration wash step.

However, unexpectedly, it has been determined that a low concentration of amine heat stable salts in the feed stream to the cation exchange unit results in lower amine loss because during cation removal with an acidic cation exchange resin, positively charged amine molecules, especially doubly charged amine molecules, will also be absorbed by the resin in competition with cation absorption. When the concentration of the heat stable salts in the amine absorbent stream is less than about 1 equivalent/mole of diamine unit, the diamine molecules possess fewer positive charges, and significantly less amines possessing two positive charges. This has several results. First, more cations from the heat stable salts are retained on the resin and, accordingly, removal of cations from the heat stable salts is enhanced on the resin resulting in the production of a used or spent acidic cation exchange resin and a salt lean diamine absorbent stream. Secondly, less amine absorbent is absorbed on the resin resulting in a reduction in the loss of amine absorbent during regeneration of the cation exchange bed. Thirdly, during the pre-resin regeneration wash step, the first portion of the spent wash water stream may have a relatively high concentration of amine absorbent permitting that portion of the stream to be returned to the acid gas recovery unit. The first portion of the spent wash water stream possesses a relatively high concentration of amine absorbent because a portion of the amine absorbent is not chemically bound to the cationic resin, but instead, physically stands in the void volume of the cationic resin. Accordingly, the spent wash water stream of the pre-resin regeneration step flushes the amine absorbent out of the resin bed during the washing step.

Accordingly, in one embodiment, the present disclosure relates to a method for treating a diamine absorbent stream comprising at least one heat stable salt, the method comprising:
(a) obtaining the diamine absorbent stream from an acid gas recovery unit, the diamine absorbent stream having a concentration of heat stable salts that is less than about 1 equivalent/mole of diamine unit; and,
(b) contacting the diamine absorbent stream with an acidic cation exchange resin and generating a salt lean diamine stream and used acidic cation exchange resin.

In any embodiment, the at least one heat stable salt may be at least one alkali metal salt of a strong acid. A strong acid is an acid that ionizes almost completely in an aqueous solution. Preferably, the strong acid comprises sulfuric acid, nitric acid or hydrochloric acid or combinations thereof.

In any embodiment, the alkali metal may comprise sodium or potassium.

In any embodiment, the acidic cation exchange resin may be a strong acid resin.

In any embodiment, the concentration of the heat stable salts may be less than about 0.7 equivalents/mole of diamine, preferably less than about 0.5 equivalents/mole of diamine and, more preferably, less than about 0.2 equivalents/mole of diamine.

In any embodiment, the method may further comprise recycling the salt lean diamine stream to the acid gas recovery unit.

In any embodiment, the method may further comprise rinsing residual diamine absorbent from the used acidic cation exchange resin with water and generating a spent wash water stream rich in the diamine absorbent. Preferably, all or a portion, and more preferably only a portion, of the spent wash water stream is recycled to the acid gas recovery unit. Alternately, or in addition, the method may further comprise the step of regenerating the used acidic cation exchange resin with an acid and subsequently rinsing the acidic cation exchange resin with water.

In any embodiment, the method may further comprise contacting the diamine absorbent stream with a basic anion exchange resin and generating an anion lean diamine absorbent solution and using at least a portion of the anion lean diamine absorbent stream in step (b). Preferably the anion lean diamine absorbent stream comprises a first portion and a second portion, the first portion is used in step (b) and the second portion is returned to the acid gas recovery unit. The first portion that is directed to the acidic cation exchange resin may have a concentration of heat stable salts that is less than 0.7 equivalent/mole of diamine, and preferably less than about 0.5 equivalents/mole of diamine and, more preferably, less than about 0.2 equivalents/mole of diamine.

In any embodiment, the basic anion exchange resin may be a weak base resin.

It will be appreciated by those skilled in the art that any of these alternate embodiments may be used individually or in combination in a single process, as exemplified in a preferred embodiment described herein, or in any particular sub-combination. Accordingly, any two or more alternate embodiments may be used in a process.

BRIEF DESCRIPTION OF THE DRAWINGS

These and other advantages of the instant invention will be more fully and completely understood in accordance with the following description of the preferred embodiments of the invention in which.

DETAILED DESCRIPTION OF THE INVENTION

While in one aspect the disclosure is directed to a method for treating a diamine absorbent stream, the disclosure will be exemplified in combination with an acid gas recovery unit used to recover acid gases from a feed gas.

Figure 1:
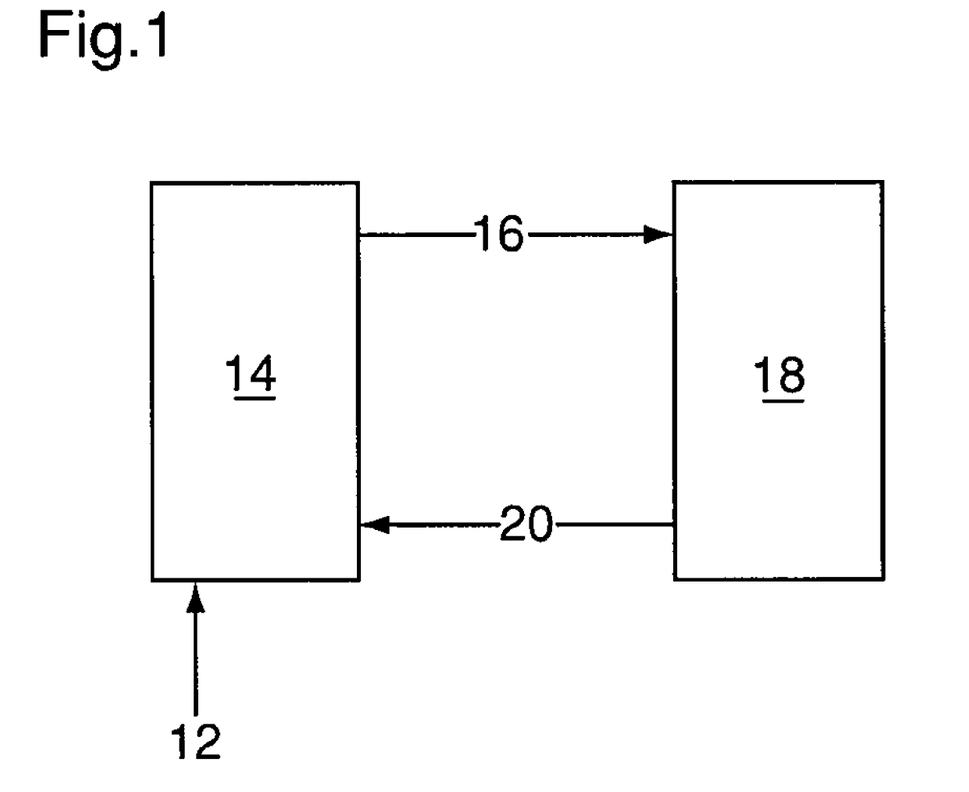
FIG. 1 is a simplified process flow diagram of an acid gas recovery unit, showing a stream connecting it to an acidic cation exchange unit according to an embodiment of this disclosure.

As exemplified in the simplified flow diagram of FIG. 1, an acid gas recovery unit 14 is integrated with an ion exchange unit 18 that includes a cation exchange resin. The cation exchange resin removes cations of heat stable salts from a diamine absorbent. A diamine absorbent stream 16 is transferred from the acid gas recovery unit 14 to the acidic cation exchange resin 18. A diamine absorbent stream comprising heat stable salts at a concentration of less than about 1 equivalent/mole of diamine unit (a heat stable salt rich absorbent stream) is contacted with the acidic cation exchange resin to produce a salt lean diamine stream 20, which is recycled back to the acid gas recovery unit 14 to be used again as an absorbent for acid gases. It will be understood by those in the art that an acidic cation exchange resin may become substantially or fully saturated resulting in a used or spent acidic cation exchange resin, requiring the regeneration of the resin.

Figure 2:
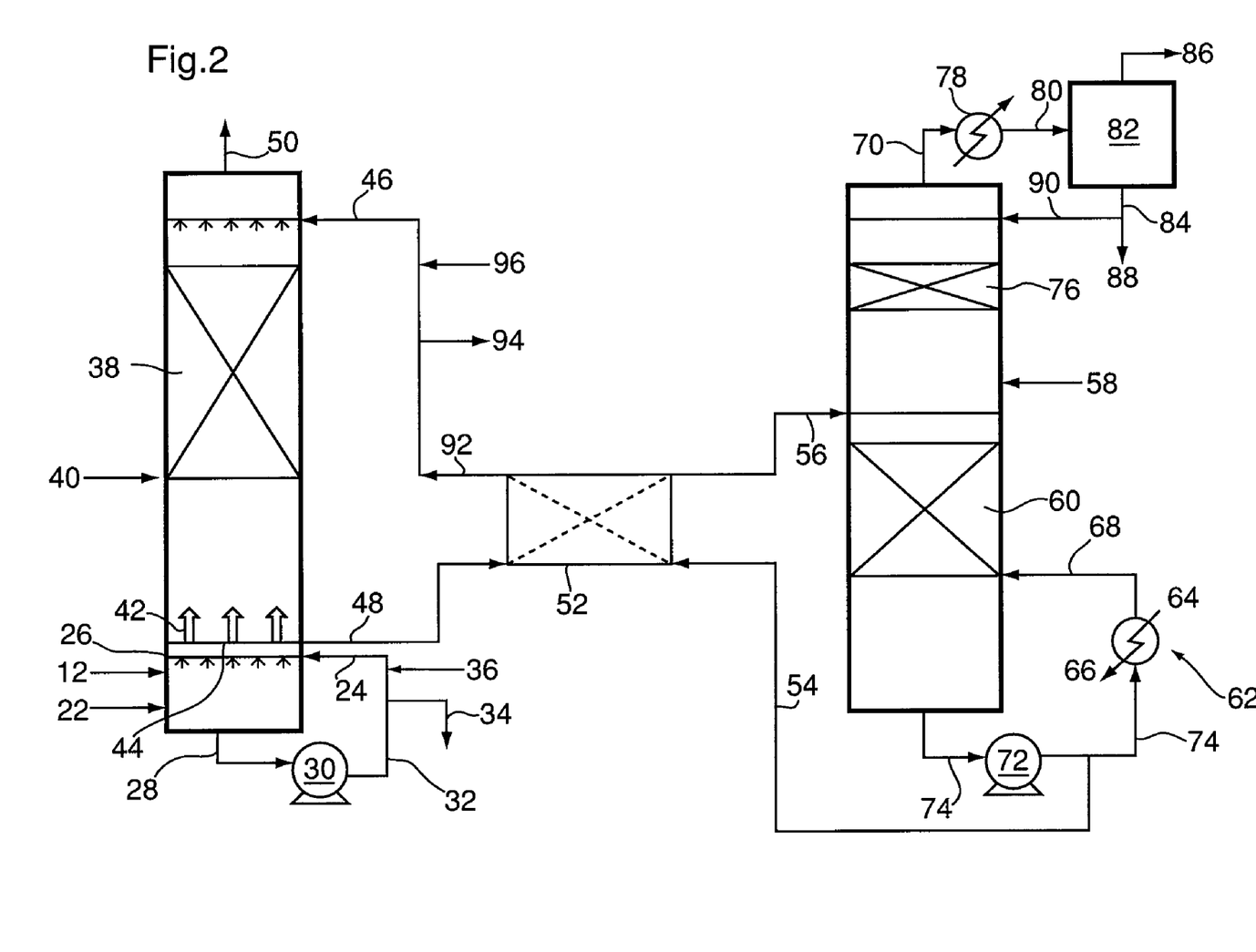
FIG. 2 is a flow diagram of the acid gas recovery unit, including a absorption unit and a regeneration unit, according to an embodiment of this disclosure.

It will be appreciated that any particular design known in the art may be used for the acid recovery unit and that the embodiments shown in FIGS. 1 and 2 are exemplary. For example a feed gas may contain only one target gas (e.g. sulphur dioxide) or a plurality of target gases (e.g. sulphur dioxide and carbon dioxide). If a plurality of gases are targeted for removal from the feed gas, then the acid recovery unit may have a plurality of absorption zones, each of which may utilize a different solvent stream thereby producing a plurality of solvent streams which may be individually regenerated by, e.g., steam stripping. Accordingly, it will be appreciated that the feed gas stream may contain only one or a plurality of acid gasses, e.g., $SO_2$ and/or $H_2S$, and/or $CO_2$ and/or $NO_x$, and that feed gas stream may be sequentially treated in different stages to reduce the concentration of each acid gas to below a predetermined level. Accordingly, a feed gas stream may be contacted with a first amine solvent to reduce the concentration of a first acid gas, e.g., $SO_2$, to below a predetermined level. The feed gas stream may then be contacted with second amine solvent to selectively capture a second acid gas, e.g. $CO_2$ from the feed gas stream. Alternately, two or more gasses may be removed in one treatment stage. Accordingly, one solvent may be used to capture two or more gasses from the feed gas stream. It will be appreciated that there may be only one treatment stage.

Heat stable salts may build up in the solvent used in each treatment stage. Therefore, at least a portion of each solvent stream, e.g. a bleed stream, may be separately fed to an ion exchange unit to remove heat stable salts from the solvent. For example, a first solvent loop may be provided for removing sulphur dioxide from an acid gas using a first solvent and regenerating the first solvent. A second solvent loop may be provided for removing carbon dioxide from the acid gas using a second solvent, subsequent to the removal of the sulphur dioxide, and regenerating the second solvent. In such a case, a first ion exchange unit may be utilized to remove heat stable salts from the first amine absorbent and a second ion exchange unit may be utilized to remove heat stable salts from the second amine absorbent. It will also be appreciated that each ion exchange unit may comprise one or a plurality of acidic cation exchange reactors or columns and may utilize feed tanks and reservoir tanks as is known in the art, such as for use in ensuring a continuous feed to an acidic cation exchange column and reducing surges through the process, while one or more columns may be taken off line for regeneration. Alternately, it will be appreciated that each solvent may be separately treated in a single acidic cation exchange unit.

The feed gas provided to the acid gas recovery process may be any gas stream that contains at least one acid gas. Preferably the feed gas stream contains at least one of $SO_2$, $CO_2$, $H_2S$ and $NO_x$, and more preferably contains at least $SO_2$ and/or $CO_2$. The feed gas may be a process gas stream or a waste gas stream obtained from various sources. For example, the feed gas stream may be:
  (a) Sour natural gas, comprising methane, other hydrocarbons, hydrogen sulfide, carbon dioxide and water, usually at elevated pressure of up to 100 bar and moderate temperature near ambient.
  (b) Flue gas from the combustion of sulfur-free fossil fuel comprising nitrogen, oxygen, carbon dioxide and water at close to atmospheric pressure and elevated temperature of up to 200° C. or even higher.
  (c) Flue gas from the combustion of sulfur containing fossil fuel, comprising nitrogen, oxygen, carbon dioxide, sulfur dioxide, sulfur trioxide and water at substantially atmospheric pressure and elevated temperature of up to 200° C. or even higher.
  (d) Sulfuric acid plant tail gas comprising nitrogen, oxygen, sulfur dioxide and sulfur trioxide at close to atmospheric pressure and moderately elevated temperature of less than 200° C.

When sulfur dioxide dissolves in and reacts with water, it produces sulfurous acid, $H_2SO_3$, which is a substantially stronger acid ($pK_{a1}=1.8$) than carbonic acid, $H_2CO_3$

($pK_{a1}$=6.4), produced by the hydration of carbon dioxide or hydrogen sulfide ($pK_{a1}$=7.0). If it is desired to capture sulfur dioxide from a feed gas using a regenerable acid gas recovery process, then an appropriately weak amine, e.g. having a $pK_a$ less than 6, is preferably used. The weak amine is not able to capture any significant quantity of $CO_2$, which stays in the treated gas. Accordingly, such a weak amine may be used to selectively capture $SO_2$ from a feed gas containing $SO_2$ and $CO_2$. In contrast, sulfuric acid mist ($pK_{a2}$=−3) is so strong that it forms heat stable salts with regenerable $SO_2$ amine absorbents.

The alkanolamine solvent used to selectively capture $SO_2$ may be any of those disclosed in U.S. Pat. No. 5,019,361, the disclosure of which is incorporated herein by reference. In particular, the solvent may be represented by the structural formula:

wherein $R^1$ is alkylene of two or three carbon atoms, $R^2$, $R^3$, $R^4$, and $R^5$ may be the same or different and can be hydrogen, alkyl (e.g., lower alkyl of 1 to about 8 carbon atoms including cycloalkyls), hydroxyalkyl (e.g., lower hydroxy alkyl of 2 to about 8 carbon atoms), aralkyl (e.g., 7 to about 20 carbon atoms), aryl (preferably monocyclic or bicyclic), alkaryl (e.g., 7 to about 20 carbon atoms), and any of $R^2$, $R^3$, $R^4$, and $R^5$ may form cyclic structures. Diamines are organic compounds containing two nitrogen atoms, and are often preferred due to their commercial availability and generally lower viscosity. The amines are preferably tertiary diamines, in view of their stability. However, others may be employed, provided mild oxidative or thermal conditions exist to minimize chemical reaction of the solvent. Often, the preferred amine salt absorbents have a hydroxyalkyl group as a substituent on an amine group. In some instances, the hydroxy substituent is believed to retard the oxidation of sulphite or bisulphite to sulphate.

To enable a high loading of recoverable sulphur dioxide to be absorbed in the absorbing medium under atmospheric pressure conditions, it is preferable for the free amine form of the amine absorbent to have a molecular weight less than about 300, preferably less than about 250. Often the tertiary diamines are of the formula:

wherein $R^1$ is an alkylene group, containing from 2 to 3 carbon atoms as a straight chain or as a branched chain, and each $R^2$ is the same or different and is an alkyl group, such as methyl or ethyl, or a hydroxy-alkyl group, such as 2-hydroxyethyl. In an embodiment, the amines may be one or more of N,N'N'-(trimethyl)-N-(2-hydroxyethyl)-ethylenediamine (pKa=5.7); N,N,N',N'-tetramethylethylenediamine (pKa=6.1); N,N,N',N'-tetrakis(2-hydroxyethyl) ethylenediamine (pKa=4.9); N-(2-hydroxyethyl)ethylenediamine (pKa=6.8); N,N'-dimethylpiperazine (pKa=4.8); N,N,N',N'-tetrakis(2-hydroxyethyl)-1,3-diaminopropane; and N',N'-dimethyl-N,N-bis(2-hydroxyethyl)ethylenediamine. Also included among the useful diamines are heterocyclic compounds, such as piperazine (pKa=5.8). The pKa values are for the sorbing nitrogen.

If it is desired to capture weak acid gases such as $H_2S$ and/or $CO_2$, then a stronger amine of $pK_a$>7.5, such as monoethanolamine, diethanolamine or methyldiethanolamine are used. Acids substantially stronger than $H_2S$ or carbonic acid will form heat stable salts. Examples are $SO_2$, formic acid, acetic acid, hydrochloric acid, sulfuric acid and thiocyanic acid.

The carbon dioxide solvent amines may be primary, secondary or tertiary amines with $pK_a$'s in the range 6.0-10, 6.5-10, or 6.5-9.5. To prevent loss of the amine with the treated gas, the amines preferably have a vapor pressure less than 1 mm Hg at 50° C. over the solvent. Amines include 4-(2-hydroxyethyl)-1-piperazineethanesulfonic acid ($pK_a$=7.5), morpholinoethanesulfonic acid ($pK_a$=6.1), N-(2-hydroxyethyl)ethylenediamine ($pK_a$ 1=9.5, $pK_a$ 2=6.5), piperazine ($pK_a$ 1=9.8, $pK_a$ 2=5.6), N-(2-hydroxyethyl)piperazine ($pK_a$ 1=9.0, $pK_a$ 2=4.5), benzimidazole ($pK_a$ 5.5), and N,N'-bis(2-hydroxyethyl)piperazine ($pK_a$ 1=7.8, $pK_a$ 2=3.9) and mixtures thereof.

If it is desired to capture both $SO_2$ and $CO_2$, then to avoid all of the $SO_2$ forming a heat stable salt in the $CO_2$ capture process, the $SO_2$ is preferably captured first with an appropriate solvent. The $CO_2$ is then removed in a second step. Since hydrogen sulfide is not thermodynamically stable in the presence of $SO_2$ or oxygen, only minor concentrations are generally found in $SO_2$ or $O_2$ containing streams.

As shown in FIG. 2, the disclosure will be exemplified in combination with an acid gas recovery unit comprising an absorption unit having a single absorption column and a regeneration unit having a single steam stripping column. Though the operation of an acid gas recovery unit 14 will be understood by those skilled in the art, the operation of the acid gas recovery unit 14 will be described.

As exemplified in FIG. 2, feed gas stream 12 is introduced to the absorption unit which comprises an apparatus to contact the feed gas with the absorbent, such as an absorption column, and may be considered to include all associated plumbing and support units, including optional prescrubber 22. As such feed gas stream 12, which may contain $SO_2$, is preferably prescrubbed to remove particulate matter from feed gas stream 12 and to preferably quench it to at least about its adiabatic saturation temperature. In some cases, the feed gas temperature may be reduced even lower by providing a heat exchanger. This scrubbing step may also remove other contaminants from the feed gas, e.g. hydrochloric acid and sulfuric acid. Any prescrubber system known in the art may be used. As shown in FIG. 2, feed gas stream 12 may be fed to prescrubber 22 where it is contacted counter-currently with a prescrubbing fluid stream 24, such as water, which may be sprayed into prescrubber 22 through suitable nozzles 26. In any embodiment, the prescrubbing fluid stream 24 may be recirculated. Accordingly, a recycle stream 28 may be fed to pump 30 from which return stream 32 is returned to prescrubber 22. A blowdown stream 34 going to waste may be used to control the level of dissolved and suspended solids in the recirculating water and a water makeup stream 36 may be used to replace water lost to evaporation into the feed gas and to blowdown.

After passing through the optional prescrubber 22, the pre-treated feed gas stream may then be passed through an absorption zone 38 in column 40, which may be a sulphur dioxide absorption zone. Prescrubbed gas 42 may flow from prescrubber 22 into the absorption column 40 through, e.g., a chimney tray 44, which allows the passage of gas up but prevents liquid from flowing down into prescrubber 22.

As exemplified, a lean diamine absorbent (i.e., lean in the acid gas impurity), which is preferably a regenerated absorbent, may be introduced via stream 46 into absorption column 40 where it preferably flows counter-current to the pre-treated feed gas stream 42 so as to produce acid gas rich diamine absorbent stream 48 and a treated or acid gas lean feed gas stream 50. As the acid gas lean diamine stream 46 flows downward through, e.g., packing in absorption zone 38, which promotes good gas-liquid contact with the upwardly flowing gas, the acid gas lean diamine stream selectively captures the acid gas impurity, leaving the absorption column 40 as acid gas rich diamine absorbent stream 48.

Acid gas lean feed gas stream 50 may then be introduced to a one or more additional absorption zones (not shown), released to the atmosphere, transported to additional equipment for further treating or recycled within a process. For example, a second absorption zone may be designed to remove carbon dioxide from the feed gas stream. A third absorption zone may be designed to remove $NO_x$ and optionally some mercury from the feed gas stream. It will be appreciated that the acid gases may be selectively removed from the feed gas in any desired order. For example, the carbon dioxide absorption zone may be upstream or downstream from the sulphur dioxide and $NO_x$ absorption zones. However, since $SO_2$ tends to form heat stable salts in solvents for weaker acid gasses, it is preferable to capture $SO_2$ before other impurity gasses.

The captured pollutant (i.e. the acid gas) is removed from the acid gas rich diamine absorbent stream 48 by heating the stream so as to liberate the captured pollutant. This is conducted in the regeneration unit. The regeneration unit includes the heat regeneration apparatus, such as a steam-stripping column 58, and all associated plumbing and support equipment. In an embodiment, a steam-stripping column 58 is utilized wherein steam provides at least some, and preferably all, of the required heat to liberate the captured pollutant from the solvent. As shown in FIG. 2 acid gas rich diamine absorbent stream 48 and hot acid gas lean amine solvent stream 54 may be passed through an indirect heat exchanger 52 to produce hot acid gas rich diamine absorbent stream 56 that is introduced into steam-stripping column 58.

As with absorption column 40, steam stripping column 58 may be of any design known in the art and may be either a packed or tray design. In an embodiment, the hot acid gas rich diamine absorbent stream 56 flows downward through, e.g., packing 60, in steam-stripping column 58. Hot acid gas rich diamine absorbent stream 56 is introduced at an upper portion of column 58 to flow downwardly through column 58. If desired, pump 72 is used to circulate stream 74 from the bottom of the steam-stripping column 58 to reboiler 62. It will be appreciated that reboiler 62 may be a forced circulation reboiler, a kettle reboiler or a thermosyphon reboiler. A hot lean diamine pump is preferably provided to push the solvent through the lean-rich exchanger into a lean amine surge tank (not shown). The steam generated by the boiling of the diamine solvent in reboiler 62 enters column 58 as stream 68 to provide the energy and mass transfer promotion for stripping the acid gas from the diamine solvent.

The reboiler is heated by any means known in the art. In an embodiment, reboiler 62 is indirectly heated by stream 64 (which may be steam and may be obtained from any source) through e.g., a heat transfer tube bundle, producing a steam condensate stream 66 which may be recycled to produce additional steam or used elsewhere in a plant. The boiling of the solvent in reboiler 62 produces a flow of steam and desorbed acid gas 68 into column 58. The steam and desorbed acid gas ascends upwardly through the desorption zone (packing 60) of column 58, heating the downward flow of hot acid gas rich diamine absorbent stream 56 and carrying upwards the gaseous pollutant (the acid gas) that is evolved from the solvent. The steam and pollutant (in this case sulphur dioxide) exits column 58 as stream 70. In an embodiment, the steam and desorbed acid gas travel upward through a reflux rectification section 76 of the column 58 prior to exiting column 58 as stream 70.

Stream 70 is cooled in the overhead condenser 78, which condenses most of the steam, creating two-phase stream 80 which may be separated in reflux accumulator 82 into overhead liquid reflux stream 84 and an acid gas stream 86. The acid gas stream 86 may flow to disposal or further processing. Overhead reflux stream 84 is preferably split into stream 88, which is optionally used in the ion exchange process, and stream 90, which is returned to steam-stripping column 58 so as to return to the diamine solvent.

Regenerated solvent collects in the bottom of column 58 and is removed from column 58 as stream 74, a portion of which is recycled as regenerated hot acid gas lean diamine absorbent stream 54. Hot acid gas lean diamine absorbent stream 54 flows through the heat exchanger 52 to form cool acid gas lean diamine absorbent stream 92.

Heat stable salts tend to build up in the diamine solvent. Accordingly, the amine solvent (e.g., a portion of the recycling absorbent stream) is subjected to an ion exchange process, comprising at least an acidic cation exchange process, to remove the heat stable salts. For example, at least a portion of the diamine absorbent is subjected to an acidic cation exchange to remove heat stable salts therefrom and in an embodiment, only a portion thereof (e.g. a bleed stream).

Figures 3, 4:
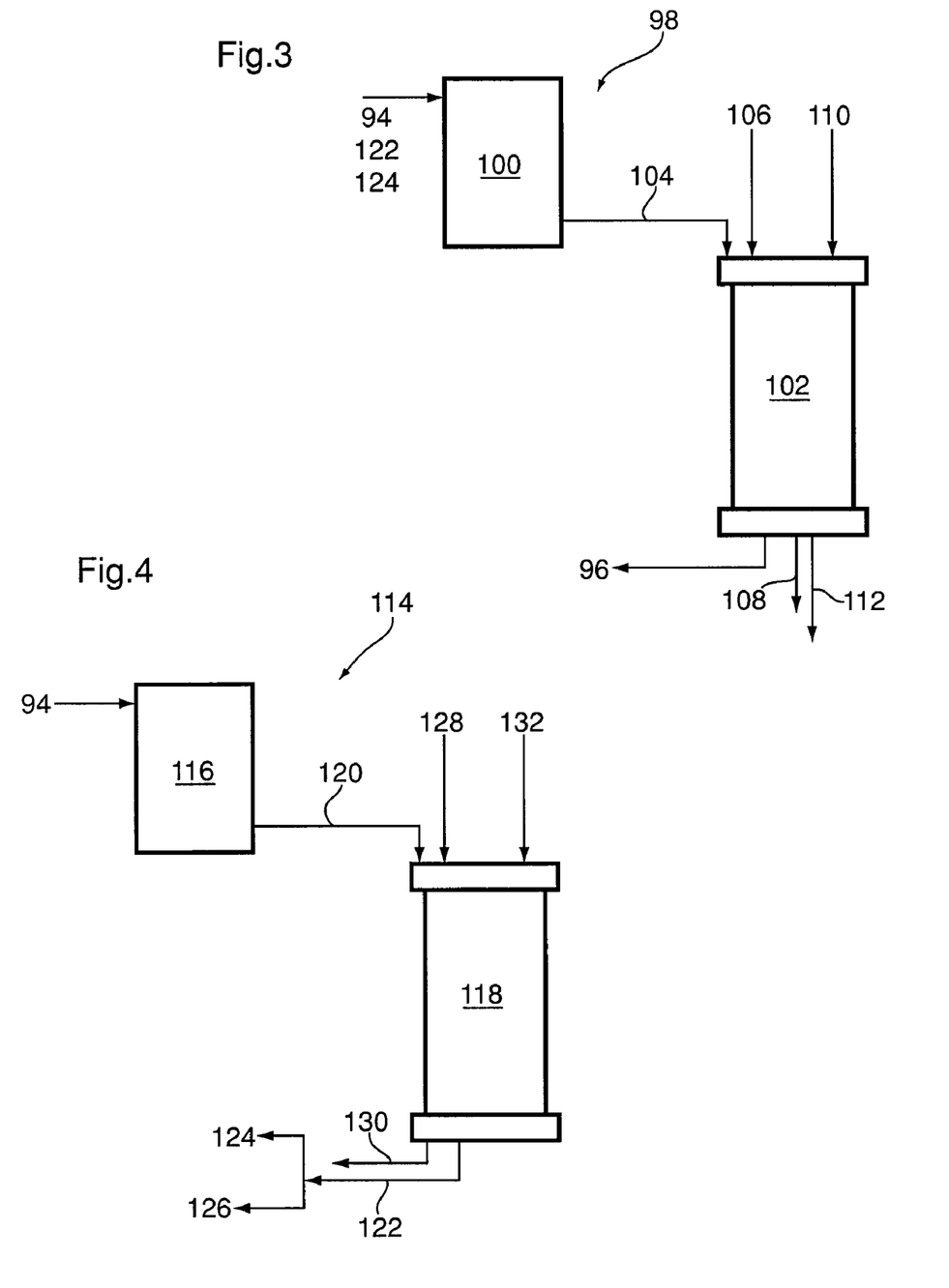
FIG. 3 is a simplified flow diagram of an acidic cation exchange unit according to an embodiment of the this disclosure.
FIG. 4 is a simplified flow diagram of a basic anionic exchange unit showing a stream connecting it to an acidic cation exchange process.

Preferably the absorbent that is treated to remove heat stable salts has been treated to remove the volatile acid gas therefrom. Therefore, absorbent that has been treated in a steam stripping unit but has not yet been recycled to an absorption unit is treated to remove heat removable salts. Preferably, as exemplified, bleed stream 94 is drawn from cool acid gas lean diamine absorbent stream 92. According to such an embodiment, as is illustrated in FIG. 3, bleed stream 94 provides a diamine absorbent stream rich in heat stable salts to the acidic cation exchange unit 98. Acidic cation exchange resin unit 98 returns heat stable salt lean diamine solvent stream 96 having a lower heat stable salt content than stream 94. Stream 46 completes the circuit, providing a heat stable salt and acid gas lean diamine stream to the absorber tower 40.

As is known to those familiar with the art, the details of the acid gas recovery unit process may be changed or added to without changing the general principles or their relevance to the present invention. For example, different types of equipment for effecting gas-liquid contact in the absorber and regenerator may be used to accomplish the same effect of absorption and stripping. Other flow sheets, such as those having lean and semi-lean amine streams may also be used in the application of the present invention. Other methods of using heat to convert the acid gas rich absorbent to acid gas lean absorbent may be used.

An embodiment of an acidic cation exchange resin unit 98 is exemplified in FIG. 3. As shown therein, an acidic cation exchange resin unit 98 includes an optional surge tank 100 and a single acidic cation exchange column 102, containing an acidic cation exchange resin. As the acidic cation exchange resin in acidic cation exchange column 102 must be occasionally regenerated, it will be appreciated that, on a periodic basis (i.e. from time to time as may be required), the flow of heat stable salt rich diamine solvent stream 104 through acidic cation exchange column 102 will be terminated permitting the acidic cation exchange resin to be regenerated. In an alternate embodiment, it will be appreciated that a plurality of acidic cation exchange columns 102 may be provided. Accordingly, heat stable salt rich diamine solvent stream 104 may be continuously fed through at least one acidic cation exchange column 102 to remove heat stable salts therefrom while the acidic cation exchange resin in one or more alternate columns 102 is being regenerated.

The heat stable salts in stream 104 are maintained at a concentration of less than about 1, preferably less than about 0.7, more preferably less than about 0.5 and, most preferably, less than about 0.2 equivalent/mole diamine unit.

Maintaining the concentration of the heat stable salts in stream 104 less than about 1 equivalent/mole of diamine unit permits a higher rate of cation removal from stream 104 while reducing loss of the absorbent during regeneration of the cation exchange resin. It will be appreciated that the acid gas capture unit may be operated using a regenerable amine having various levels of heat stable salts. Preferably, acid gas rich diamine absorbent stream 48 contains a heat stable salt concentration of about 1.1 to about 1.4 eq/mol diamine. Consequently, as described below, it is preferable to pass the acid gas lean diamine absorbent stream 92 through a basic anionic exchange resin first to lower the concentration of the heat stable salts to less than about 1.0, preferably about 0.7, more preferably less than about 0.5 and most preferably, less than about 0.2 equivalent/mole diamine. This results in the acidic cation exchange resin removing the remaining heat stable salts with higher efficiency. It will be appreciated that the use of an anionic exchange resin upstream of the cationic exchange resin is not required if the level of heat stable salts in the absorbent drawn from the acid gas recovery unit has a heat stable salts to less than about 1.

During the acidic cation exchange process, positively charged amine molecules, especially doubly charged amine molecules, will also be absorbed by the resin in competition with cations from the heat stable salts (e.g., sodium and/or potassium) that are dissolved in the absorbent. When the concentration of the heat stable salts in the diamine absorbent stream is less than about 1 equivalent/mole of diamine unit, the diamine molecules possess fewer positive charges. It will be understood by those skilled in the art that heat stable salts are pairs of anions (such as sulfate, $SO_4^{2-}$) and amine (RR'NH$^+$, the cation). As the concentration of the anion is lowered, there is a corresponding decrease in the protonation level of the amine. As a result, the cation exchange resin will tend to become loaded with more cations from the heat stable salts and fewer absorbent molecules. Accordingly the ratio of heat stable salt cations to absorbent molecules that are retained by the cation exchange resin is enhanced.

Any construction for an acidic cation exchange reactor known in the art may be utilized. Typically, the acidic cation exchange medium is a resin that is formed as beads. The ion exchange medium therefore may be beads of polymers that have functional groups on the polymer. Accordingly, an acidic cation exchange column typically has a support to receive the ion exchange resin beads. A cation exchange resin generally has acidic functions as the exchange sites. Strong acidic cation exchange resins are typically characterized by strong acid functionalities, such as sulfonic acid. The strong acid functionality exchange their protons (H$^+$) for cations contained in the stream to be treated.

The preceding resin is merely illustrative of useful acidic cation exchange resins and is not intended to limit the resins that may be used in carrying out the process of the disclosure.

For the purpose of the present disclosure, it is intended that any acidic cation exchange resin that may be used for the salt (i.e. cation) removal from an acid gas absorbent may be used. These resins are readily identifiable by those skilled in the art.

Heat stable salt rich diamine absorbent stream 104 (which may be obtained from surge tank 100) or may merely be an extension of bleed stream 94 if surge tank 100 is not provided, is permitted to flow through acidic cation exchange column 102 to produce salt lean diamine absorbent stream 96. This is the resin loading step or the exhaustion of the resin step. During this step, the resin in column 102 reacts with the diamine absorbent to remove cations (such as sodium and potassium) from the diamine absorbent. When the ability of the acidic cation exchange resin to remove cations from the diamine absorbent reaches a desired level, or after a predetermined time, the flow of diamine absorbent through column 102 is terminated. The salt lean diamine absorbent stream 96 may be returned to any desired location in acid gas recovery unit 14 and, in an embodiment, is introduced downstream from heat exchanger 52 and upstream from column 40 as shown in FIG. 2.

Subsequent to the exhaustion step of the resin, the acidic cation exchange resin is preferably treated to remove the residual diamine absorbent therefrom prior to commencing the regeneration step. Therefore, in accordance with this invention, the acidic cation exchange resin is contacted with a wash water stream 106, to remove diamine absorbent from column 102. All, or a portion of, spent wash water stream 108, which is washed from the resin with wash water stream 106, is preferably recycled back to the acid gas recovery unit 14 downstream from heat exchanger 52 and upstream from column 40 (similar to stream 96). Wash water stream 108 preferably comprises a sulfurous acid stream, which is preferably obtained from a reflux stream of a steam stripping column used to regenerate a sulfur dioxide absorbent.

Figure 6:
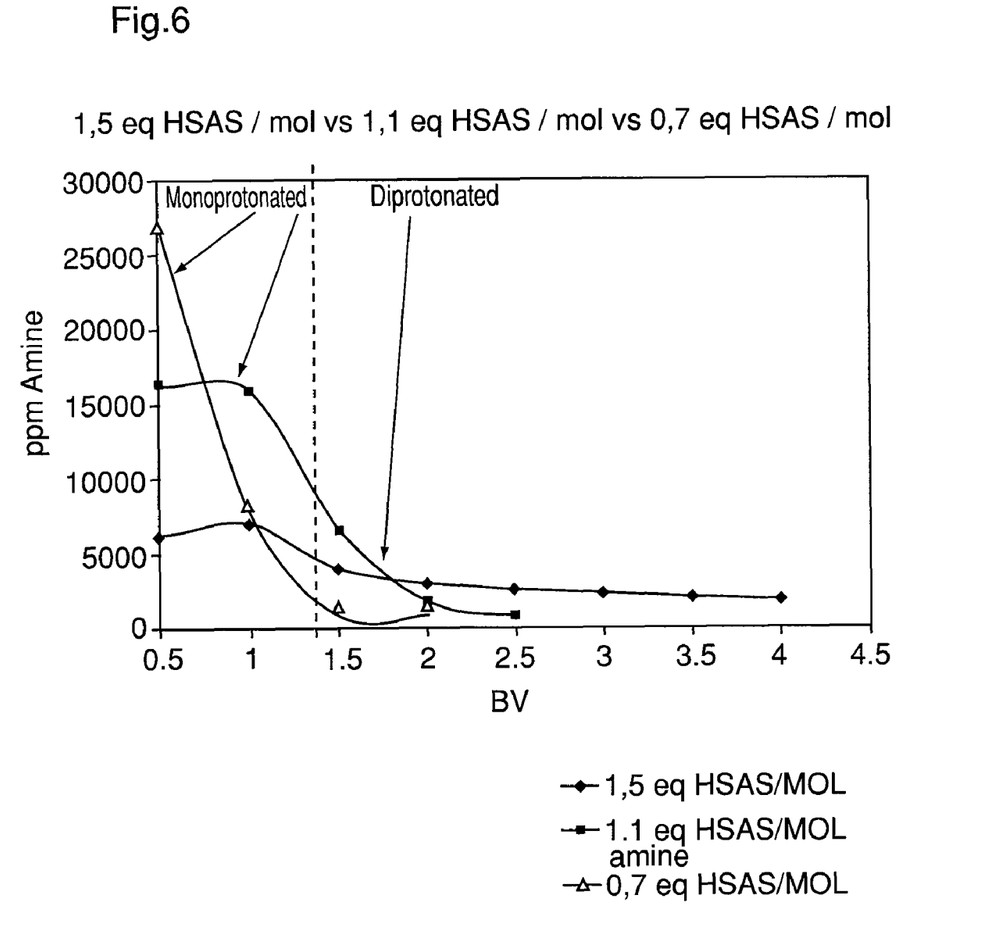

As best exemplified in FIG. 6, if the concentration of heat stable amine salts provided to the cation exchange resin are maintained at a concentration of less than about 1.0 heat stable salt amine/mol of diamine unit, the first portion of the spent wash water stream 108 may comprise a residual diamine rich stream that has a relatively high concentration of amine (e.g., above 15,000 ppm) for about the first bed volume. If the concentration of heat stable amine salts provided to the cation exchange resin are maintained at a concentration of 0.7 heat stable salt amine/mol of diamine unit, then the first bed volume of wash water that passes through the resin bed will become spent wash water stream 108 having an amine concentration that drops rapidly from over 25,000 ppm to less than 10,000 ppm. Preferably, the first portion of spent wash water stream 108 is recycled to the acid gas recovery unit as recycled absorbent. The first portion preferably has a concentration of amine greater than 1000 ppm, more preferably greater than 2000 ppm and most preferably greater than 3000 ppm. This prevents the loss of some of the absorbent without overly diluting the absorbent that is recycled in the acid gas recovery unit. In an embodiment, preferably about 3 to about 5.5, and more preferably about 3 to about 4 bed volumes (BV) of wash water are used and, preferably the first portion of spent wash water stream 108 is recycled to the acid gas capture unit. This first portion preferably comprises the first 1 to 3, and more preferably 1 to 1.5 bed volumes (BV) of spent wash water stream 108.

Subsequently, the acidic cation exchange resin is regenerated using a regeneration agent. For example, the regeneration agent may be an acidic solution, which is supplied via stream 110. The regeneration agent may be diluted sulfuric acid or diluted sulfurous acid and is preferably diluted sulfurous acid. The regeneration agent converts the acidic cation exchange resin back to its starting form. Accordingly, the acid converts the acidic cation exchange resin back to its acidic form. The regeneration step results in the production of a spent regeneration agent solution 112. Stream 112 may be fed to prescrubber 22 (it may form part or all of stream 36).

In an embodiment, before lean diamine absorbent stream 94 is directed to an acidic cation exchange resin unit 98, stream 94 is preferably directed to a basic anion exchange unit 114 to remove anions, such as sulfates, thiosulfates, sulfites, chlorides, nitrates and organic acids. These anions are preferably removed to prevent amine protonation, and consequently, loss of amine during the cation removal step.

As exemplified in FIG. 4, a basic anion exchange unit 114 includes an optional surge tank 116 and a single basic anion exchange column 118, containing basic anionic exchange resin. As the basic anion exchange resin in basic anion exchange column 118 must be occasionally regenerated, it will be appreciated that on a periodic basis (i.e., from time to time as may be required) the flow of heat stable salt rich diamine absorbent stream 120 through basic anionic exchange column 118 may be terminated permitting the basic anionic exchange resin to be regenerated. In an alternate embodiment, it will be appreciated that a plurality of basic anionic exchange columns 118 may be provided. Accordingly, heat stable salt rich diamine solvent stream 120 may be continuously fed through at least one basic anionic exchange column 118 to remove anions therefrom while the basic anionic exchange resin in one or more alternate columns 118 is being regenerated.

Stream 120 is fed through the basic anionic exchange column 118 to produce an anion lean diamine absorbent stream 122 and at least a portion of stream 122 is directed to the acidic cation exchange resin unit 98 for removal of cations. In a preferred embodiment, the anion lean diamine absorbent stream 122 comprises a first portion 124 and a second portion 126, wherein the first portion 124 is directed towards the acidic cation exchange resin unit 98, while the second portion 126 is directed to diamine absorbent stream 48. In an embodiment, the first portion 124 preferably comprises a concentration of heat stable salts as disclosed herein. The first portion may comprise from 10% to 50%, preferably 20% to 30% of anion lean diamine absorbent stream 122.

Similar to the acidic cation exchange resin, the anionic basic exchange resin will also need to be regenerated due to exhaustion of the resin. Subsequent to the exhaustion step of the resin, the anionic basic exchange resin is preferably treated to remove the residual diamine absorbent therefrom prior to commencing the regeneration step. Therefore, in accordance with this disclosure, the acidic cation exchange resin is contacted with a wash water stream 128, to remove diamine absorbent from column 118. All or a portion of residual diamine rich absorbent stream 130, which is washed from the resin with water stream 128, may be recycled back to the acid gas recovery unit 14 and preferably to absorption column 40. Stream 130 may be returned to the continuous amine loop in acid gas recovery unit 14 downstream from heat exchanger 52 and upstream from column 40 (similar to stream 96).

Subsequently, the anionic basic exchange resin is regenerated using a regeneration agent. For example, the regeneration agent may be a basic solution, which is supplied via stream 132. The regeneration agent may be diluted caustic. The regeneration agent converts the anionic basic exchange resin back to its starting form. Accordingly, the base converts the anionic basic exchange resin back to its basic form.

Any construction for a basic anion exchange reactor known in the art may be utilized. Typically, the basic anion exchange medium is a resin that is formed as beads. Accordingly, a basic anion exchange column typically has a support to receive the ion exchange resin beads. The basic anion exchange medium therefore may be beads of polymers that have functional groups on the polymer. A basic anion exchange resin generally has basic functions as the exchange sites, such as quaternary ammonium salts. Weak base anion exchange resins are typically characterized by functionalities with lower pKa, such as tertiary amines. The basic functionalities of the resin exchange their anions with anions contained in the stream to be treated.

The removal of heat stable salts from both strong and weak amine solvents may be performed by essentially the same process, with only optional adjustment for the type of resin and type and quantity of regeneration agent and rinse volumes being necessary to optimize for each particular amine solvent and type of heat stable salts.

It will be appreciated that various modifications and variations may be made and all of those modifications and variations are within the scope of the following claims. For example, any $SO_2$, $CO_2$, $H_2S$ and $NO_x$ solvent known in the art may be used. The solvents may be regenerated and recycled and, if so, they may be regenerated and recycled by any means known in the art. The ion exchange unit may use surge tanks and storage tanks to accumulate the various streams which are used in the ion exchange unit or which are produced by the ion exchange unit. Any ion exchange resin or series of resins known in the art may be used. It will also be appreciated that the steps may be combined in various combinations and subcombinations.

EXAMPLES

The operation of the invention is illustrated by the following representative examples. As is apparent to those skilled in the art, many of the details of the examples may be changed while still practicing the disclosure described herein.

Example 1

Sodium Removal from a Diamine Regenerable $SO_2$ Absorbent

This example exemplifies the removal of sodium from a diamine absorbent using a cation exchange resin. The absorbent that was provided to the test bed was Cansolv® Absorbent DS contaminated with sodium. The composition is given in Table 1.

TABLE 1

| Composition of Sodium Contaminated Diamine Absorbent | |
|---|---|
| Amine concentration (wt %) | 24.2 |
| Sodium concentration (wt %) | 2 |
| Sulfate concentration (wt %) | 12 |
| HSAS: (eq. $SO_4^{2-}$/mol amine) | 1.1 |
| Water (wt %) | 61.8 |

The testing was performed with Lewatitt K-2629 strong acid ion exchange resin in a 3 cm diameter insulated column. The resin bed had a height of 35 cm and a bed volume (BV) of 200 ml. All fluids introduced to the column were at 50° C. The resin was conditioned by several cycles of loading and regeneration prior to making the experiments.

The sodium removal experiment was done using the procedure as follows:
1. Amines and sodium were loaded on the resin by passing 1.5 BV of the contaminated diamine absorbent through the column. Na+ ions and amine were loaded on resin and H+ ions were displaced into the amine solution exiting the column.
2. The resin was washed with 1.5 BV of water to displace the amine solvent from the resin prior to regenerating the resin.
3. The resin was regenerated back to the base form by passing 2.5 BV of 4% wt. sulfuric acid through the column. During this step, H+ ions are loaded on resin and Na+ ions and remaining amine are displaced into regeneration phase
4. The resin bed was then subjected to a final wash with 1.5 BV of water to rinse remaining regenerant from the resin bed.
5. The next loading step was conducted.

Figure 5:
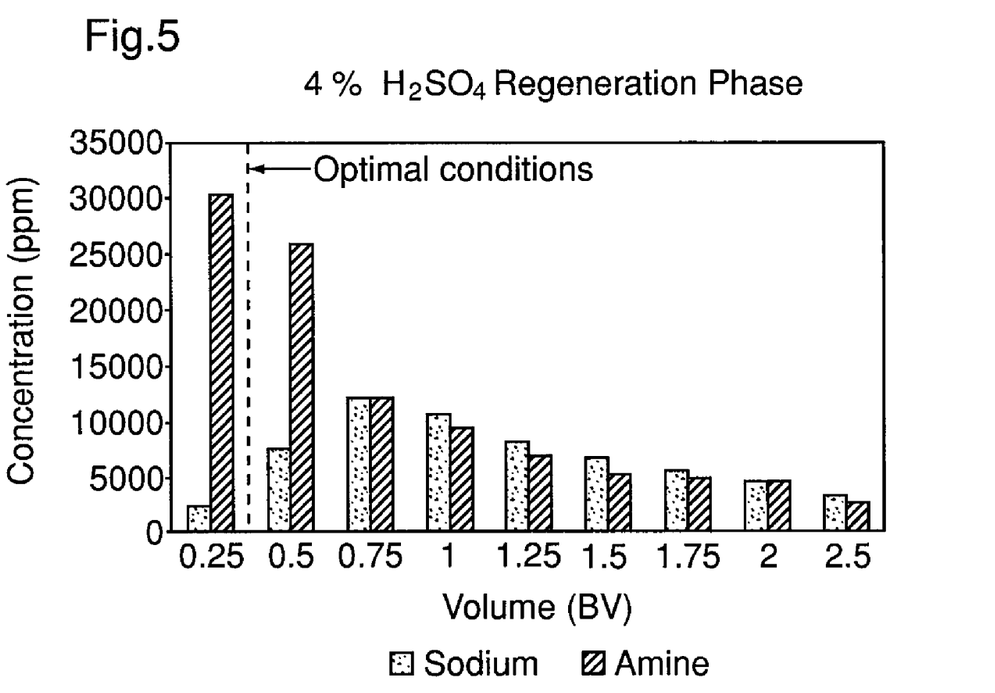
FIG. 5 is a graph showing the sodium and amine concentration of the effluent out of a cation resin bed during regeneration of the resin, measured in bed volume of regeneration agent; and, FIG. 6 is a graph showing the sodium and amine concentration of the regenerant during the regeneration step of an acidic cation exchange column, wherein varying concentrations of heat stable salts were present in the heat stable salt rich absorbent stream fed to the acidic cation exchange column.

Samples of the column effluent during the pre-regeneration wash phase (step 2) were taken every 0.25 BV and analyzed for sodium and amine content. The results are shown in the FIG. 5. As can be seen in FIG. 5, a considerable amount of amine co-elutes with the sodium and may be lost from the scrubbing process. It will be appreciated that the first portion of the wash water has a relatively high concentration of amine to sodium. Accordingly, the first portion of the wash water may be return to an acid gas capture unit within returning much sodium to the amine absorbent used in the acid gas capture unit. In this example, the first quarter BV, and possibly the second quarter BV could be returned.

Table 2 shows the amine loss and sodium removal as a function of the volume of wash water sent to the acid gas capture unit. The optimum is to return the first 0.25 BV to the acid gas capture unit, giving a ratio of 1.13 g of amine lost per gram of sodium removed. However, returning the first 0.5 BV to the acid gas capture unit also produces good results.

TABLE 2

Amine Loss and Sodium Removal as a Function of Volume of Regenerant Returned

| Regen. Returned (BV) | Na removal (g/L resin) | Amine loss (g/L resin) | Amine lost/ Na removed |
|---|---|---|---|
| 0 | 15.9 | 29.3 | 1.85 |
| 0.25 | 13.5 | 15.3 | 1.13 |
| 0.5 | 10.5 | 12.3 | 1.17 |

Example 2

The effect of amine heat stable salt level on sodium removal performance was tested. Once again, sodium contaminated Cansolv® Absorbent DS was used for the experiments. The conditions of the experiment are shown in Table 3.

TABLE 3

Composition of the spent absorbent

| Conditions | Run 1 | Run 2 | Run 3 |
|---|---|---|---|
| Amine concentration (wt %) | | 25 | |
| Sodium concentration (wt %) | | 1 | |
| Sulfate concentration (wt %) | 12.9 | 10 | 7.1 |
| HSAS (eq $SO_4^{2-}$/mol amine) | 1.5 | 1.1 | 0.7 |

TABLE 3-continued

Composition of the spent absorbent

| Conditions | Run 1 | Run 2 | Run 3 |
|---|---|---|---|
| Amine in diprotonated form | 50% | 10% | 0% |
| Amine in monoprotonated form | 50% | 90% | 70% |
| Amine in unprotonated form | 0% | 0% | 30% |

The same procedure was used as in Example 1, but with the flow conditions are set out in Table 4.

TABLE 4

Flow Conditions for Example 2

| Phase | Volume passed (BV) | Flowrate (BV/hr) |
|---|---|---|
| Sodium loading | 2 | 15 |
| Amine washing | 2.5 | |
| Regeneration ($H_2SO_4$ 1%) | 4 | |
| Rinse | 1.5 | |

The regeneration effluent was analyzed for amine and the results are shown in FIG. 6. A summary of the sodium removal efficiency and amine loss is given in Table 5. It is clear that low heat stable salt levels favors higher sodium removal and lower amine loss.

TABLE 5

Amine Loss at Varying Concentrations of Heat Stable Salts

| HSAS (eq $SO_4^{2-}$/mol amine) | Volume kept (BV) | Sodium removal (g/L resin) | Amine loss (g/L resin) | Ratio Amine lost/ Sodium removed |
|---|---|---|---|---|
| 1.5 | 1 | 5.6 | 6.0 | 1.07 |
| 1 | 1 | 6.8 | 4.3 | 0.63 |
| 0.7 | 1 | 7.8 | 2.6 | 0.33 |

The invention claimed is:

1. A method for treating a diamine absorbent stream comprising at least one heat stable salt, the method comprising:
   a. obtaining the diamine absorbent stream from an acid gas recovery unit, the diamine absorbent stream having a concentration of heat stable salts that is less than about 1 equivalent/mole of diamine unit;
   b. contacting the diamine absorbent stream with an acidic cation exchange resin and generating a salt lean diamine stream and used acidic cation exchange resin; and
   c. rinsing residual diamine absorbent from the used acidic cation exchange resin with water and generating a spent wash water stream;
   d. recycling a portion of the spent wash water stream to the acid gas recovery unit.

2. The method according to claim 1, wherein the at least one heat stable salt is at least one alkali metal salt of a strong acid.

3. The method according to claim 2, wherein the strong acid comprises sulfuric acid, nitric acid or hydrochloric acid.

4. The method according to claim 2, wherein the alkali metal comprises sodium or potassium.

5. The method according to claim 1, wherein the acidic cation exchange resin is a strong acid resin.

6. The method according to claim 1, wherein the concentration of the heat stable salts is less than about 0.7 equivalents/mole of diamine.

7. The method according to claim 1, wherein the concentration of the heat stable salts is less than about 0.5 equivalents/mole of diamine.

8. The method according to claim 1, wherein the concentration of the heat stable salts is less than about 0.2 equivalents/mole of diamine.

9. The method according to claim 1, further comprising recycling the salt lean diamine stream to the acid gas recovery unit.

10. The method according to claim 1, further comprising the step of regenerating the used acidic cation exchange resin with an acid and subsequently rinsing the acidic cation exchange resin with water.

11. The method according to claim 1, further comprising contacting the diamine absorbent stream with a basic anion exchange resin and generating an anion lean diamine absorbent stream and using at least a portion of the anion lean diamine absorbent stream in step (b) of claim 1.

12. The method according to claim 11, wherein the anion lean diamine absorbent stream comprises a first portion and a second portion, the first portion is used in step (b) of claim 1 and the second portion is returned to the acid gas recovery unit.

13. The method according to claim 12, wherein the first portion that is directed to the acidic cation exchange resin has a concentration of heat stable salts that is less than 0.7 equivalent/mole of diamine.

14. The method according to claim 13, wherein the concentration of heat stable salts is less than about 0.5 equivalents/mole of diamine.

15. The method according to claim 14, wherein the concentration of heat stable salts is less than about 0.2 equivalents/mole of diamine.

16. The method according to claim 11, wherein the basic anion exchange resin is a weak base resin.

17. A method for treating a diamine absorbent stream comprising at least one heat stable salt, the method comprising:
   a. obtaining the diamine absorbent stream from an acid gas recovery unit, the diamine absorbent stream having a concentration of heat stable salts that is less than about 1 equivalent/mole of diamine unit;
   b. contacting the diamine absorbent stream with an acidic cation exchange resin and generating a salt lean diamine stream and used acidic cation exchange resin; and,
   c. contacting the diamine absorbent stream with a basic anion exchange resin and generating an anion lean diamine absorbent stream, wherein the anion lean diamine absorbent stream comprises a first portion and a second portion, the first portion is used in step (b) and the second portion is returned to the acid gas recovery unit.

18. The method according to claim 17, wherein the at least one heat stable salt is at least one alkali metal salt of a strong acid.

19. The method according to claim 18, wherein the strong acid comprises sulfuric acid, nitric acid or hydrochloric acid.

20. The method according to claim 18, wherein the alkali metal comprises sodium or potassium.

21. The method according to claim 17, wherein the acidic cation exchange resin is a strong acid resin.

22. The method according to claim 17, wherein the concentration of the heat stable salts is less than about 0.7 equivalents/mole of diamine.

23. The method according to claim 17, wherein the concentration of the heat stable salts is less than about 0.5 equivalents/mole of diamine.

24. The method according to claim 17, wherein the concentration of the heat stable salts is less than about 0.2 equivalents/mole of diamine.

25. The method according to claim 17, further comprising recycling the salt lean diamine stream to the acid gas recovery unit.

26. The method according to claim 17, further comprising rinsing residual diamine absorbent from the used acidic cation exchange resin with water and generating a spent wash water stream.

27. The method according to claim 17, further comprising recycling a portion of the spent wash water stream to the acid gas recovery unit.

28. The method according to claim 26, further comprising the step of regenerating the used acidic cation exchange resin with an acid and subsequently rinsing the acidic cation exchange resin with water.

29. The method according to claim 17, wherein the first portion that is directed to the acidic cation exchange resin has a concentration of heat stable salts that is less than 0.7 equivalent/mole of diamine.

30. The method according to claim 29, wherein the concentration of heat stable salts is less than about 0.5 equivalents/mole of diamine.

31. The method according to claim 30, wherein the concentration of heat stable salts is less than about 0.2 equivalents/mole of diamine.

32. The method according to claim 17, wherein the basic anion exchange resin is a weak base resin.

\* \* \* \* \*